United States Patent
Yanagisawa

(10) Patent No.: US 9,481,782 B2
(45) Date of Patent: Nov. 1, 2016

(54) RUBBER COMPOSITION, INNER LINER MATERIAL, AND PNEUMATIC TIRE

(71) Applicant: BRIDGESTONE CORPORATION, Chuo-ku, Tokyo (JP)

(72) Inventor: Aya Yanagisawa, Higashimurayama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 14/769,537

(22) PCT Filed: Feb. 27, 2014

(86) PCT No.: PCT/JP2014/001077
§ 371 (c)(1),
(2) Date: Aug. 21, 2015

(87) PCT Pub. No.: WO2014/132658
PCT Pub. Date: Sep. 4, 2014

(65) Prior Publication Data
US 2015/0376378 A1 Dec. 31, 2015

(30) Foreign Application Priority Data
Feb. 28, 2013 (JP) ................................. 2013-039896

(51) Int. Cl.
C08K 3/34 (2006.01)
B60C 1/00 (2006.01)
C08K 9/04 (2006.01)
C08L 23/36 (2006.01)

(52) U.S. Cl.
CPC ............... *C08K 9/04* (2013.01); *B60C 1/0008* (2013.04); *C08K 3/346* (2013.01); *C08L 23/36* (2013.01); *C08K 2201/008* (2013.01); *C08K 2201/016* (2013.01)

(58) Field of Classification Search
CPC .. C08K 3/346; C08K 9/04; C08K 2201/008; C08K 2201/016; B60C 1/0008; C08L 23/36
USPC ......................................................... 152/510
See application file for complete search history.

(56) References Cited

U.S. PATENT DOCUMENTS

| | | | |
|---|---|---|---|
| 5,162,445 A | 11/1992 | Powers et al. | |
| 2007/0105998 A1 | 5/2007 | Gong et al. | |
| 2007/0129477 A1* | 6/2007 | Weng ...................... | C08L 23/00 524/394 |

FOREIGN PATENT DOCUMENTS

| | | |
|---|---|---|
| CN | 101287778 A | 10/2008 |
| CN | 101316888 A | 12/2008 |
| EP | 1942136 A1 | 7/2008 |
| EP | 1972466 A1 | 9/2008 |
| EP | 1404749 B1 | 2/2009 |
| JP | H01-198645 A | 8/1989 |
| JP | 2005-187527 A | 7/2005 |
| JP | 2009-501841 A | 1/2009 |
| JP | 2009-517524 A | 4/2009 |
| JP | 2010-043257 A | 2/2010 |
| WO | 2004/005388 A1 | 1/2004 |
| WO | 2009/064295 A1 | 5/2009 |

OTHER PUBLICATIONS

Jun. 10, 2014 International Search Report issued in International Patent Application No. PCT/JP2014/001077.
Nov. 26, 2015, Extended European Search Report issued by the European Patent Office in the corresponding European Patent Application No. 14757493.3.

\* cited by examiner

*Primary Examiner* — Angela C Scott
(74) *Attorney, Agent, or Firm* — Kenja IP Law PC

(57) ABSTRACT

Provided is a rubber composition having superior gas-barrier properties. More specifically, the rubber composition contains a layered compound and a modified butyl-based rubber having a functional group that interacts with the layered compound.

12 Claims, No Drawings

RUBBER COMPOSITION, INNER LINER MATERIAL, AND PNEUMATIC TIRE

TECHNICAL FIELD

The disclosure relates to a rubber composition, an inner liner material, and a pneumatic tire.

BACKGROUND

Rubber compositions containing a layered compound are known for their improved material properties, which is achieved by separating the layers (nanosheets with high aspect ratio) composing the layered compound and dispersing the separated layers in the rubber composition. However, the layers of the layered compound are generally not readily separated due to the attracting force of electric charges between the layers, resulting in poor dispersibility of the layers in the rubber composition. To solve this problem, for example, Patent Literature 1 (PTL 1) proposes a rubber composition that contains a complex and a solid rubber, in which the complex is composed of a liquid rubber having positively charged groups and a layered silicate (dispersed in the liquid rubber). PTL 1 reports that such a rubber composition has superior mechanical characteristics, oil resistance, fatigue resistance, and processability. However, it is not always easy to prepare the liquid rubber that incorporates onium ions as positively charged groups as described in PTL 1. Moreover, even if technique of PTL 1 is successfully employed, swelling between the layers of the layered compound, and therefore the separation of the layers of the layered compound, is often insufficient, which may often lead to the failure to provide expected physical properties.

CITATION LIST

Patent Literature

PTL 1: JPH1-198645A

SUMMARY

Technical Problem

The products disclosed herein have been produced in view of the above situations. It could be helpful to provide a rubber composition having superior gas-barrier properties, an inner liner material to be the material of an inner liner having superior gas-barrier properties, and a pneumatic tire that ensures superior retention of the gas filled therein, by improving the separation properties of the layers composing the layered compound in the rubber composition.

Solution to Problem

The products disclosed herein for achieving the above objects mainly features the following.

Specifically, the rubber composition disclosed herein contains a layered compound, and a modified butyl-based rubber having a functional group that interacts with the layered compound.

Advantageous Effect

According to the disclosure, provided is a rubber composition having superior gas-barrier properties, an inner liner material to be the material of an inner liner having superior gas barrier properties, and a pneumatic tire that ensures superior retention of the gas filled therein.

DETAILED DESCRIPTION

Hereinafter, the disclosed products will be specifically described by illustrating embodiments.

The disclosed rubber composition contains a layered compound and a modified butyl-based rubber having a functional group that interacts with the layered compound.

<Layered Compound>

Examples of the layered compound disclosed herein include layered clay minerals, layered polysilicates, and zirconium phosphate.

Examples of the layered clay minerals include kaolin mineral, serpentine, pyrophyllite-talc, mica, chlorite, smectite, and vermiculite.

Examples of the kaolin mineral include kaolinite, dickite, nacrite, and halloysite.

Examples of the serpentine include chrysotile, lizardite, and antigorite.

Examples of the pyrophyllite-talc include pyrophyllite, talc, kerolite, willemseite, pimelite, and minnesotaite.

Mica is a rhombic layered silicate characterized by a perfect base cleavage, and its general chemical composition is represented by the formula below.

$$XY_{2\text{-}3}Z_4O_{10}(OH,F)_2$$

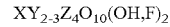

(where X represents one of Ba, Ca, ($H_3O$), K, Na, or ($NH_4$), Y represents one of Al, $Cr^{3+}$, $Fe^{2+}$, $Fe^{3+}$, Li, Mg, $Mn^{2+}$, or $V^{3+}$, and Z represents one of Al, Be, Fe, or Si.) Either natural mica or synthesized mica can be used. Examples of mica include white mica, gold mica, black mica, and fluorine gold mica.

Examples of the chlorite include clinochlore (Mg chlorite), FeMg chlorite, chamosite (Fe chlorite), nimite, pennantite, donbassite, sudoito, and cookeite.

Examples of the smectite include montmorillonite, beidellite, nontronite, saponite, hectorite, and stevensite. Smectite is a clay mineral containing a substance represented by the formula below.

$$[Si_8(Mg_aLi_b)O_{20}OH_cF_{4-c}]^{-x}Na^{+x}$$

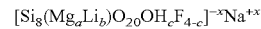

(where the letters a, b, c, and x satisfy the relations $0<a\le 6$, $0<b\le 6$, $4<a+b<8$, $0\le c<4$, $x=12-2a-b$.) The clay mineral may be a natural material or a synthetic material, or may be a clay mineral having been subjected to lipophilization.

Examples of the layered polysilicate include magadiite, kanemite, and kenyaite.

Of the layered compounds, to improve the gas-barrier properties of the rubber composition, kaolin mineral, serpentine, pyrophyllite-talc, mica, chlorite, smectite, and vermiculite are preferred. Further, montmorillonite, mica, vermiculite, beidellite, nontronite, saponite, hectorite, stevensite having a two-to-one structure are more preferred. These layered compounds having a two-to-one structure have exchangeable cations between the layers, which further improves separation properties of the layers of the layered compound. This consequently results in further improvement in the gas-barrier properties of the disclosed rubber composition. Of these, considering the separation properties of the layers of the layered compound, montmorillonite and mica are particularly preferred.

The layered compound disclosed herein is preferably organized with an organizing agent. Being organized, the layered compound can increase its compatibility with the rubber component. Further, the layered compound as organized can increase the interlayer distance of the layered compound, allowing the modified butyl-based rubber, which will be described later, to readily enter the space between the layers of the layered compound. This will consequently further improve the gas-barrier properties of the disclosed rubber composition. Here, the preferred organizing agent contains at least one kind of onium cation selected from the group consisting of ammonium cations, phosphonium cations, oxonium cations, and sulfonium cations, considering the improvement in the gas-barrier properties of the rubber composition. Specifically, salts containing the above cations are preferred as the organizing agent.

The particularly preferred organizing agent for the disclosed products are those that contain the quaternary ammonium cations having the structure shown by the formula (4) below or those that contain the quaternary phosphonium cations having the structure shown by the formula (5) below, considering the above-mentioned effects of the organizing agent.

[Chemical Formula 1]

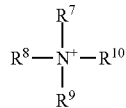

(4)

[Chemical Formula 2]

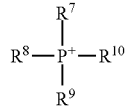

(5)

In the formulae (4) and (5), $R^7$ to $R^{10}$ each independently represent an aryl group such as a benzyl group, an alkyl group having a carbon number of 1 to 30, a $(CH_2CH(CH_3)O)_nH$ group, or a $(CH_2CH_2O)_nH$ group, where n represents an integer of 1 to 50.

Examples of the quaternary ammonium salt containing the quaternary ammonium cations of formula (4) include polyoxypropylene trialkyl ammonium chloride, polyoxypropylene trialkyl ammonium bromide, di(polyoxypropylene) dialkyl ammonium chloride, di(polyoxypropylene)dialkyl ammonium bromide, tri(polyoxypropylene)alkyl ammonium chloride, tri(polyoxypropylene)alkyl ammonium bromide.

Examples of the quaternary phosphonium salt containing the quaternary phosphonium cations of formula (5) include aryl tri-n-butyl phosphonium bromide, benzyl tri-n-butyl phosphonium chloride, benzyl triethyl phosphonium chloride, dodecyl tri-n-butyl phosphonium bromide, dodecyl tri-n-butyl phosphonium chloride, ethyltri-n-octyl phosphonium bromide, hexadecyl tri-n-butyl phosphonium bromide, hexadecyltri-n-butyl phosphonium chloride, hexadecyl tri-n-butyl phosphonium tetrafluoroborate, methyltri-n-butyl phosphonium chloride, tetraethylphosphonium bromide, tetra-n-butyl phosphonium chloride, and n-octyl tri-n-butyl phosphonium bromide.

When the layered compound is organized with an organizing agent, a layered compound having swelling properties for organic solvent is preferably used in order to allow, for example, the above quaternary ammonium cations to readily enter the space between the layers of the layered compound. With such a layered compound having swelling properties, the above quaternary ammonium cations can more readily enter the space between the layers, which consequently further improves the separation properties of the layers composing the layered compound contained in the rubber composition. To allow this effect, mica having a large average grain diameter, particularly swelling mica, is preferably used, among the above-listed layered compounds. Although the average grain diameter of the mica is not limited to particular size, it is preferably 3 to 30 µm.

The layered compound can be organized by, for example, dipping the layered compound in an aqueous solution containing onium cations and then washing the layered compound by water to remove excessive onium cations. The content of the above onium cations in the organized layered compound is not particularly limited but is preferably 20 to 60% by mass.

Further, the layered compound preferably has a distance of 12 Å or greater between the layers of the layered compound (hereinafter referred to as "interlayer distance") regardless of whether the layered compound is organized or not. With the interlayer distance of 12 Å or greater, the modified butyl-based rubber, which will be described later, can readily enter the interlayer space. The interlayer distance of the layered compound is not particularly limited but is typically 40 Å or less. The interlayer distance of the layered compound can be measured by X-ray diffraction.

The disclosed rubber composition may contain only one kind of the layered compound or may contain combination of two or more kinds thereof. The content of the layered compound is preferably 1 to 200 parts by mass, more preferably 1 to 100 parts by mass, and particularly preferably 3 to 80 parts by mass per 100 parts by mass of the modified butyl-based rubber, which will be described later. With the content of the layered compound being 1 part by mass or more per 100 parts by mass of the modified butyl-based rubber, the effect of the disclosed products can be sufficiently obtained, and with the content being 200 parts by mass or less, the rubber composition demonstrates good processability. If the layered compound is organized, the content of the layered compound herein refers the content of the layered compound that has been organized.

<Modified Butyl-Based Rubber>

The modified butyl-based rubber as disclosed herein refers to a butyl-based rubber to which a functional group that interacts with the above-described layered compound is introduced through the reaction with a modifying agent. The butyl-based rubber as disclosed herein refers to a copolymer that contains isobutylene units. The butyl-based rubber contains other repeating units in addition to the isobutylene units. Examples of such other repeating unit include, but not limited to, isoprene units and aromatic vinyl compound units. Examples of the aromatic vinyl compound unit include a styrene unit, p-methyl styrene unit, o-methyl styrene unit, and m-methyl styrene unit. The butyl-based rubber may contain only one kind of repeating unit in addition to the isobutylene unit, or may contain two or more kinds thereof in addition to the isobutylene unit. Of the repeating units, the butyl-based rubber preferably contains aromatic vinyl compound units to allow easy manufacture of modified butyl-based rubber. It is further preferred that the butyl-based rubber contain at least one of p-methyl styrene units, o-methyl styrene units, or m-methyl styrene units. It is particularly preferred that the butyl-based rubber contain p-methyl styrene units. The preferred butyl-based rubber is a copolymer containing isobutylene units and aromatic vinyl compound units alone as repeating units (isobutylene-aromatic vinyl compound copolymer). A copolymer containing isobutylene units and p-methyl styrene units alone as repeating units (isobutylene-p-methyl styrene copolymer) is particularly preferred.

The bond content of the isobutylene unit in the disclosed butyl-based rubber is preferably 70.0 to 99.4% by mol, more preferably 90 to 99.4% by mol. With the bond content of the isobutylene unit in the copolymer being 70.0% by mol or more, good gas-barrier properties can be obtained, and with the bond content being 99.4% by mol, a network structure can be formed.

The disclosed modified butyl-based rubber has the functional group that interacts with the above-described layered compound only at at least one position selected from the terminal, the main chain, and the side chain. Examples of the functional group that interacts with the above-mentioned layered compound include, but not limited to, functional groups that form hydrogen bonding or van der Waals interaction with the layered compound. Of the interactions, hydrogen bonding is preferred, considering the separation properties of the layers of the layered compound and therefore the gas-barrier properties of the rubber composition.

The functional group that interacts with the above-mentioned layered compound is preferably a nitrogen-containing functional group. Examples of such a nitrogen-containing functional group include a nitrile group, an azo group, an isocyanate group, a substituted or unsubstituted amino group, a substituted or unsubstituted amide group, a substituted or unsubstituted imino group, a substituted or unsubstituted imidazole group, a substituted or unsubstituted pyridyl group, and a substituted or unsubstituted imide group. The substituent groups of the substituted amino group, substituted amide group, substituted imino group, substituted imidazole group, substituted pyridyl group, and substituted imide group may be protecting groups such as acetyl groups, formyl groups, TMS (trimethylsilyl) groups, Boc (tert-butoxycarbonyl) groups, and Z (benzyl oxycarbonyl) groups. The modified butyl-based rubber containing the nitrogen-containing functional group exhibits particularly superior affinity for the layered compound, which further improves the separation properties of the layers composing the layered compound and consequently the gas-barrier properties of the disclosed rubber composition. Of the nitrogen-containing functional groups, primary amino groups (unsubstituted amino group) or secondary amino groups are particularly preferred to improve the separation properties and gas-barrier properties. This is because primary amino groups and secondary amino groups have hydrogen atoms that allow strong interaction with the layered compound.

To improve the gas-barrier properties of the disclosed rubber composition, the modified butyl-based rubber used for the rubber composition preferably contains isobutylene units and p-methyl styrene units, and has a structure in which at least one hydrogen atom in the methyl group at p-position in the p-methyl styrene units is substituted by a group containing a nitrogen-containing functional group. Here, the group containing a nitrogen-containing functional group may be the nitrogen-containing functional group itself. Further, the "structure in which at least one hydrogen atom in the methyl group at p-position in the p-methyl styrene units is substituted by a group containing a nitrogen-containing functional group" may not necessarily require that at least one hydrogen atom in the methyl group at p-position in all of the p-methyl styrene units in the butyl-based rubber be substituted. In some of the p-methyl styrene units, none of the hydrogen atoms may be substituted.

To further improve the gas-barrier properties of the rubber composition, the group containing the above-mentioned nitrogen-containing functional group is preferably at least one selected from the group consisting of the groups represented by the formula (1) below, the groups represented by the formula (2) below, the groups represented by the formula (3) below, and unsubstituted amino groups.

[Formula 3]

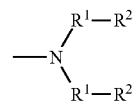

(1)

In the formula (1), each $R^1$ independently represents an alkylene group having a carbon number of 1 to 8, preferably an alkylene group having a carbon number of 1 to 5, more preferably an alkylene group having a carbon number of 1 to 3; and each $R^2$ independently represents a nitrile group, or a substituted or unsubstituted amino group.

Such a group containing the nitrogen-containing functional group can be introduced by, for example, reacting a modifying agent, such as bis(3-aminopropyl amine) and 3,3-iminodipropionitrile, with a butyl-based rubber having a halogen group, which is described later.

[Formula 4]

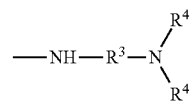

(2)

In the formula (2), $R^3$ represents an alkylene group having a carbon number of 1 to 8, preferably an alkylene group having a carbon number of 1 to 5, more preferably an alkylene group having a carbon number of 1 to 3; and each $R^4$ independently represents a hydrogen atom or a protecting group, in which the protecting group may be an acetyl group, a formyl group, a TMS (trimethylsilyl) group, a Boc (tert-butoxycarbonyl) group, or a Z (benzyl oxycarbonyl) group.

Such a group containing the nitrogen-containing functional group can be introduced by, for example, reacting a modifying agent such as N-(tert-butoxycarbonyl)-1,3-diaminopropane with the butyl-based rubber having a halogen group, which is described later.

[Formula 5]

—NH—$R^5$—$R^6$ (3)

In the formula (3), $R^5$ represents an alkylene group having a carbon number of 1 to 8, preferably an alkylene group having a carbon number of 1 to 5, more preferably an alkylene group having a carbon number of from 1 to 3; and $R^6$ represents a hydrogen group or a trialkoxysilyl group, in which the trialkoxysilyl group may be a trimethoxysilyl group or a triethoxysilyl group.

Such a group containing the nitrogen-containing functional group can be introduced by, for example, reacting a modifying agent such as 3-amino propyltriethoxysilane with the butyl-based rubber having a halogen group, which is described later.

If an unsubstituted amino group is used as the group containing the nitrogen-containing functional group, such an unsubstituted amino group can be introduced by, for example, reacting a modifying agent such as N-potassium phthalimide, and further hydrazine, with the butyl-based rubber having a halogen group, which is described later.

The modified butyl-based rubber having a functional group that interacts with the layered compound can be manufactured by any method. For example, the modified butyl-based rubber may be manufactured by reacting a modifying agent having a nitrogen-containing functional group with a butyl-based rubber having a halogen group (hereinafter referred to as halogenated butyl-based rubber). The halogenated butyl-based rubber may be any butyl-based rubber that has a halogen group at at least one of the terminal, the main chain, or the side chain. The halogenated butyl-based rubber may be manufactured, for example, by copolymerizing isobutylene and a monomer having a halogen group, or by copolymerizing isobutylene and other monomer and halogenating the resulting copolymer.

The following describes the method of manufacturing a halogenated butyl-based rubber by copolymerizing isobutylene and a monomer having a halogen group. For example, isobutylene and a monomer having a halogen group may be copolymerized by copolymerizing isobutylene and an aromatic vinyl compound having a halogen group through cationic polymerization.

The cationic polymerization initiator used in the above cationic polymerization is a reagent for initiating cationic polymerization, which is a chain polymerization reaction that uses cations as active species of growth. Examples of the cationic polymerization initiator include, but not limited to, Lewis acids, such as boron trichloride ($BCl_3$), aluminum chloride ($AlCl_3$), tin tetrachloride ($SnCl_4$), titanium tetrachloride ($TiCl_4$), vanadium pentachloride ($VCl_5$), iron trichloride ($FeCl_3$), boron trifluoride ($BF_3$), chloro diethyl aluminum ($Et_2AlCl$), and dichloro-ethyl aluminum ($EtAlCl_2$). Of these, titanium tetrachloride is preferred.

The solvent typically used for cationic polymerization can be appropriately used for the solvent of the above-mentioned cationic polymerization. For example, hydrocarbon solvent, such as aliphatic hydrocarbon, aromatic hydrocarbon, and halogenated hydrocarbon, may be used. Of these solvents, aromatic hydrocarbon is preferred, and toluene is more preferred. Examples of the aliphatic hydrocarbon include pentane and hexane. Examples of the aromatic hydrocarbon include benzene, toluene, and xylene. Examples of the halogenated hydrocarbon include chloromethane, chloroethane, methylene chloride, 1,1-dichloroethane, chloroform, and 1,2-dichloroethane. These may be used alone or in combination of two or more thereof. Further, in combination with these solvents, small amounts of other solvent, for example acetic acid esters such as ethyl acetate or an organic compound having a nitro group such as nitroethane, may also be used.

The polymerization temperature of the above cationic polymerization is preferably from −100° C. to −30° C. If the temperature is below −100° C., polymerization reaction proceeds slow. If the temperature is above −30° C., the chain transfer reaction becomes severe. This tends to cause significant decrease in molecular weight, which is unfavorable.

The above cationic polymerization is preferably performed under a pressure which sufficiently allows the monomers to be substantially kept in a liquid phase. Specifically, although the reaction pressure is changed depending on the monomers to be polymerized or solvent to be used and the polymerization temperature, the polymerization can be performed under higher reaction pressure, if desired. Such a high pressure can be achieved by, for example, applying pressure to the reactor with a gas inert to the polymerization reaction or any other appropriate method.

In the manufacture of the above copolymer, generally, it is suitable that catalytic poison, such as water, oxygen, and carbon dioxide, is removed from all of the substances used for the manufacture, such as a monomer, a cation polymerization initiator, and a solvent.

Other than by copolymerizing isobutylene and the monomer having a halogen group as above, the halogenated butyl-based rubber may be manufactured, for example, by halogenating the copolymer obtained by copolymerizing isobutylene and an aromatic vinyl compound or by halogenating so-called butyl rubber obtained by cationic-polymerizing isobutylene and a small amount of isoprene (a method for manufacturing typical halogenated butyl rubber). One example of the halogenated butyl-based rubber obtained by halogenating the copolymer obtained by copolymerizing isobutylene and an aromatic vinyl compound may be a isobutylene-p-methyl styrene copolymer (EXXPRO®3035 manufactured by ExxonMobil), in which some or all of the hydrogen atoms of the methyl group of p-methyl styrene units are substituted by bromine atoms.

Examples of the modifying agent having a nitrogen-containing functional group for reacting with the halogenated butyl-based rubber include bis(3-aminopropyl)amine, 3,3-iminodipropionitrile, N-(tert-butoxycarbonyl)-1,3-diaminopropane, 3-aminopropyltriethoxysilane, and N-potassium phthalimide. These may be used alone or in combination of two or more thereof. Of these modifying agents, bis(3-aminopropyl)amine is preferred, considering the ease of reaction of the modifying agent with the halogenated butyl-based rubber.

For example, it is preferred that bis(3-aminopropyl) amine, which has two hydrogen atoms in each of the two primary amino groups at opposite terminals, have at least one of the two hydrogen atoms being protected by the above-mentioned protecting group before being reacted with the halogenated butyl-based rubber. By reacting bis(3-aminopropyl)amine with the halogenated butyl-based rubber after protecting it by the protecting group, the secondary amino group existing at the center of the bis(3-aminopropyl) amine can be selectively reacted with the halogen atoms of the halogenated butyl-based rubber in the reaction.

The modified butyl-based rubber used for the rubber composition of the disclosure may contain the above-mentioned protecting group or may have the protecting group being removed. The removal of the protecting group may be performed by any publicly known method such as desolvation treatment that uses water vapor (or specifically steam stripping) or hydrolysis, which is performed before the modified butyl-based rubber is being mixed with the layered compound and other compounding agents. Alternatively, the removal of the protecting group may be performed by hydrolysis with acid, which is performed in the kneading step of the production process of the rubber composition.

In the reaction of the above-mentioned halogenated butyl-based rubber with the modifying agent having a nitrogen-containing functional group, the modifying agent is added preferably in an amount of 1 to 30 mol per 1 mol of the halogenated butyl-based rubber. Examples of the solvent used for the reaction of the above-mentioned halogenated butyl-based rubber with the modifying agent having a nitrogen-containing functional group include chloroform, toluene, and hexane. These may be used alone or in combination of two or more thereof. The reaction temperature of the reaction of the above-mentioned halogenated butyl-based rubber with the modifying agent having a nitrogen-containing functional group is preferably no lower than room temperature, and is preferably no higher than the boiling point of each solvent.

The modified butyl-based rubber used for the disclosed rubber composition preferably has a weight-average molecular weight (Mw) of 10,000 to 1,000,000, and more preferably has a Mw of 25,000 to 75,000. With the weight-average molecular weight (Mw) of 10,000 or greater, the rubber composition exhibits good rubber performance. With the weight-average molecular weight (Mw) of 1,000,000 or less, the rubber composition demonstrates good processability. Further, the molecular weight distribution, expressed by weight-average molecular weight (Mw)/number-average molecular weight (Mn) ratio, is preferably 1 to 4, and is more preferably 1 to 3. With the molecular weight distribution within the above range, the rubber composition incorporating the modified butyl-based rubber does not decease its workability, so that kneading can be done easily and the physical properties of the rubber composition can be sufficiently improved. The above-mentioned weight-average molecular weight (Mw) and number-average molecular weight (Mn) are values obtained in term of standard polystyrene measured by gel permeation chromatography (GPC).

(Rubber Composition)

The rubber composition disclosed herein may of course contain other rubber components in addition to the above-mentioned modified butyl-based rubber. The rubber composition as disclosed herein may contain compounding agents including, for example, a vulcanizing agent such as sulfur, a filler such as silica and carbon black, an oil content such as process oil, a vulcanization accelerator, an antioxidant, a softening agent, zinc oxide, and stearic acid. The disclosed rubber composition can be produced with any usual method. For example, the rubber composition may be produced by kneading the modified butyl-based rubber, other suitable rubber components, the layered compound, and the suitable compounded agents; or by producing a rubber master batch containing the modified butyl-based rubber, other suitable rubber components, and the layered compound, and then kneading the rubber master batch with the suitable compounding agents as mentioned above. The rubber master batch may be prepared for example by mixing the modified butyl-based rubber, other suitable rubber components, and the layered compound, with water and/or organic solvent, followed by removal of the water and/or organic solvent.

(Inner Liner Material)

The inner liner material disclosed herein is made of the disclosed rubber composition. To be formed into an inner liner, the disclosed inner liner material is extruded by the usual method, and is vulcanized in the state of being installed in an unvulcanized pneumatic tire or is vulcanized alone. Such an inner liner has superior gas-barrier properties.

(Pneumatic Tire)

The pneumatic tire disclosed herein includes an inner liner formed with the inner liner material disclosed herein. The disclosed pneumatic tire may be manufactured by any usual method. The air to be filled in the tire may contain inert gas, such as nitrogen, argon, and helium, in addition to normal air or air for which oxygen partial pressure has been adjusted. The pneumatic tire exhibits superior retention of the gas filled therein.

EXAMPLES

In the following, the disclosed products will be specifically described with reference to examples; however, the disclosure is not limited to those examples.

In the examples, for $^1$H-NMR measurement, FT-NMR manufactured by JEOL Ltd. was used. For molecular weight measurement, gel permeation chromatography [GPC: HLC-8220 manufactured by Tosoh Corporation, column: GMH-XL (two of them arranged in series) manufactured by Tosoh Corporation, detector: differential refractometer (RI)] was used to obtain Mn and Mw by using monodisperse polystyrene as a reference.

<Manufacture of Amine-Modified Butyl-Based Rubber (I)>

Introduction of Protecting Group into Nitrogen-Containing Functional Group in Modifying Agent To 4 L of THF, 135 g of bis(3-aminopropyl)amine and 300 g of triethylamine were added and stirred, followed by icing. To the resulting solution, a solution obtained by dissolving 500 g of 2-(Boc-oxyimino)-2-phenyl acetonitrile in 2 L of THF was dropped. After completion of the dropping, the solution was stirred all night at room temperature. Subsequently, the solution obtained was refined by separation process, followed by removal of the solvent. The resulting product was vacuum dried at 50° C. and 250 g of Boc compound of bis(3-aminopropyl)amine was obtained. $^1$H-NMR measurement verified that a Boc group was introduced into the amino group at both terminals of bis(3-aminopropyl)amine.

Reaction of Halogenated Butyl-Based Rubber with Modifying Agent

To 8 L of chloroform, 400 g of EXXPRO3035 (brominated isobutylene-p-methyl styrene copolymer) was added and stirred at room temperature under Ar gas flow. Subsequently, 250 g of the above Boc compound of bis(3-aminopropyl)amine and 410 ml of diisopropylethylamine were further added and the mixture was stirred all night at room temperature. After the reaction, the reactant was refined by reprecipitation with methanol, to obtain a Boc compound of bis(3-aminopropyl)amine-modified isobutylene-p-methyl styrene copolymer.

Removal of Protecting Group

The above Boc compound was dissolved in 17 L of chloroform, and 820 ml of trifluoroacetate was added thereto and the mixture was then stirred (de-Boc reaction). The reactant obtained was refined by reprecipitation with metha-nol/ammonia water, followed by removal of the solvent. The product was then vacuum dried at 40° C. to obtain 400 g of bis(3-aminopropyl)amine-modified isobutylene-p-methyl styrene copolymer (hereinafter referred to as "amine-modified butyl-based rubber (I)"). $^1$H-NMR measurement verified that the amine-modified butyl-based rubber (I) has a structure in which at least one of the hydrogen atoms in the methyl group at p-position in the p-methyl styrene units is substituted by the group derived from bis(3-aminopropyl)amine. The obtained amine-modified butyl-based rubber (I) had a weight-average molecular weight (Mw) of 50,000 and a molecular weight distribution of 3.0.

<Manufacture of Amine-Modified Butyl-Based Rubber (II)>

Reaction of Halogenated Butyl-Based Rubber with Modifying Agent

To 8 L of chloroform, 400 g of EXXPRO3035 (brominated isobutylene-p-methyl styrene copolymer) was added and stirred at room temperature under Ar gas flow. Subsequently, 250 g of N-(t-butoxycarbonyl)-1,3-diaminopropane and 410 ml of diisopropylethylamine were further added, and the mixture was stirred all night at room temperature. After the reaction, the reactant was refined by reprecipitation with methanol, and N-(t-butoxycarbonyl)-1,3-diaminopropane-modified isobutylene-p-methyl styrene copolymer was obtained.

Removal of Protecting Group

The above N-(t-butoxycarbonyl)-1,3-diaminopropane-modified isobutylene-p-methyl styrene copolymer was dissolved in 17 L of chloroform, and 820 ml of trifluoroacetate was added thereto and the mixture was then stirred (de-Boc reaction). The reactant obtained was refined by reprecipitation with methanol/ammonia water, followed by removal of the solvent. The product was then vacuum dried at 40° C. to obtain 400 g of 1,3-diaminopropane-modified isobutylene-p-methyl styrene copolymer (hereinafter referred to as "amine-modified butyl-based rubber (II)"). $^1$H-NMR measurement verified that the amine-modified butyl-based rubber (II) has a structure in which at least one of the hydrogen atoms in the methyl group at p-position in the p-methyl styrene units is substituted by the group derived from 1,3-diaminopropane. The amine-modified butyl-based rubber (II) obtained had a weight-average molecular weight (Mw) of 50,000, and a molecular weight distribution of 3.3.

<Manufacture of Amine-Modified Butyl-Based Rubber (III)>

To 8 L of chloroform, 400 g of EXXPRO3035 (brominated isobutylene-p-methyl styrene copolymer) was added and stirred at room temperature under Ar gas flow. Subsequently, 250 g of 3-aminopropyltriethoxysilane and 410 ml of diisopropylethylamine were further added, and the mixture was stirred all night at room temperature. After the reaction, the reactant was refined by reprecipitation with methanol to obtain a 3-aminopropyltriethoxysilane-modified isobutylene-p-methyl styrene copolymer (hereinafter referred to as "amine-modified butyl-based rubber (III)"). $^1$H-NMR measurement verified that the amine-modified butyl-based rubber (III) has a structure in which at least one of the hydrogen atoms in the methyl group at p-position in the p-methyl styrene units is substituted by the group derived from 3-aminopropyltriethoxysilane. The amine-modified butyl-based rubber (III) obtained had a weight-average molecular weight (Mw) of 50,000, and a molecular weight distribution of 3.6.

<Manufacture of Amine-Modified Butyl-Based Rubber (IV)>

To 8 L of chloroform, 400 g of EXXPRO3035 (brominated isobutylene-p-methyl styrene copolymer) was added and stirred at room temperature under Ar gas flow. Subsequently, 250 g of N-potassium phthalimide was further added, and the mixture was stirred all night at room temperature. After the reaction, the reactant was refined by reprecipitation with methanol to obtain a phthalimide-modified isobutylene-p-methyl styrene copolymer.

The above phthalimide-modified isobutylene-p-methyl styrene copolymer was dissolved in 17 L of chloroform and 820 ml of hydrazine was added thereto. The mixture was then stirred. The reactant obtained was refined by reprecipitation with methanol, followed by removal of the solvent. The product was then vacuum dried at 40° C. to obtain 400 g of amine-modified isobutylene-p-methyl styrene copolymer (hereinafter referred to as "amine-modified butyl-based rubber (IV)"). $^1$H-NMR measurement verified that the amine-modified butyl-based rubber (IV) has a structure in which at least one of the hydrogen atoms in the methyl group at p-position in the p-methyl styrene units is substituted by the unsubstituted amino group. The amine-modified butyl-based rubber (IV) obtained had a weight-average molecular weight (Mw) of 50,000 and a molecular weight distribution of 3.0.

<Production of Rubber Compositions of Examples 1 to 5 and 11 to 13 and Comparative Examples 1 to 7>

The above amine-modified butyl-based rubbers (I) to (IV) and the above brominated isobutylene-p-methyl styrene copolymer (expressed as "halogenated butyl-based rubber (I)" in Table 1) are each kneaded with compounding agents, in accordance with the formulation shown in Table 1 below, using a Plasto mill, to produce the rubber compositions of Examples 1 to 5 and 11 to 13 and Comparative Examples 1 to 7. In Table 1, this production method is indicated as "A".

<Production of Rubber Compositions of Examples 6 to 10>

One hundred parts by mass of the above amine-modified butyl-based rubber (I) was dissolved in toluene, and Cloisite20A (montmorillonite organized with dimethyl dihydrogenated tallow ammonium chloride), which had been dispersed in toluene separately, was added to the above solution. The mixture was stirred for 6 hours at 100° C. and then the solvent was removed to obtain a rubber master batch. With the rubber master batch obtained, the compounding agents in accordance with the formulation shown in Table 1 below were kneaded using a Plasto mill, to thereby produce the rubber compositions of Examples 6 to 10. In Table 1, this production method is indicated as "B".

<<Air Permeability (Gas-Barrier Properties)>>

The above rubber compositions were vulcanized for 30 minutes at 150° C., and their air permeability were evaluated with the following method. Using air permeation tester M-C1 (manufactured by TOYO SEIKI Co., Ltd.), air permeability of each rubber composition was measured at 60° C. The results are shown in Table 1 with indices based on the air permeability of the rubber composition of Comparative Example 1 being 100. Smaller index values imply low air permeability, indicating good gas-barrier properties.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Producing method | | A | A | A | A | A | B | B | B | B | B |
| Formulation (pts. by mass) | Amine-modified butyl-based rubber (I) | 100 | 100 | 100 | 100 | 100 | 100 | 100 | 100 | 100 | 100 |
| | Amine-modified butyl-based rubber (II) | — | — | — | — | — | — | — | — | — | — |
| | Amine-modified butyl-based rubber (III) | — | — | — | — | — | — | — | — | — | — |
| | Amine-modified | — | — | — | — | — | — | — | — | — | — |

TABLE 1-continued

|  |  | 1 | 2 | 3 | 4 | 5 | 6 | 7 | 8 | 9 | 10 |
|---|---|---|---|---|---|---|---|---|---|---|---|
|  | butyl-based rubber (IV) | — | — | — | — | — | — | — | — | — | — |
|  | Halogenated butyl-based rubber (I) |  |  |  |  |  |  |  |  |  |  |
|  | Layered compound A *1 | 5 | 20 | 50 | 100 | 200 | 5 | 20 | 50 | 100 | 200 |
|  | Stearic acid *2 | 2 | 2 | 2 | 2 | 2 | 2 | 2 | 2 | 2 | 2 |
|  | Zinc flower *3 | 2 | 2 | 2 | 2 | 2 | 2 | 2 | 2 | 2 | 2 |
|  | Vulcanization accelerator A *4 | 0.4 | 0.4 | 0.4 | 0.4 | 0.4 | 0.4 | 0.4 | 0.4 | 0.4 | 0.4 |
|  | Vulcanization accelerator B *5 | 0.3 | 0.3 | 0.3 | 0.3 | 0.3 | 0.3 | 0.3 | 0.3 | 0.3 | 0.3 |
|  | Vulcanization accelerator C *6 | 0.8 | 0.8 | 0.8 | 0.8 | 0.8 | 0.8 | 0.8 | 0.8 | 0.8 | 0.8 |
|  | Sulfur *7 | 1.3 | 1.3 | 1.3 | 1.3 | 1.3 | 1.3 | 1.3 | 1.3 | 1.3 | 1.3 |
| Evaluation | Air permeability (Index value) | 73 | 48 | 28 | 19 | 10 | 70 | 47 | 26 | 15 | 8 |

|  |  | Example | | | Comparative Example | | | | | | |
|---|---|---|---|---|---|---|---|---|---|---|---|
|  |  | 11 | 12 | 13 | 1 | 2 | 3 | 4 | 5 | 6 | 7 |
| Producing method |  | A | A | A | A | A | A | A | A | A | A |
| Formulation (pts. by mass) | Amine-modified butyl-based rubber (I) | — | — | — | — | — | — | — | — | 100 | — |
|  | Amine-modified butyl-based rubber (II) | 100 | — | — | — | — | — | — | — | — | — |
|  | Amine-modified butyl-based rubber (III) | — | 100 | — | — | — | — | — | — | — | — |
|  | Amine-modified butyl-based rubber (IV) | — | — | 100 |  |  |  |  |  |  |  |
|  | Halogenated butyl-based rubber (I) | — | — | — | 100 | 100 | 100 | 100 | 100 | — | 100 |
|  | Layered compound A *1 | 20 | 20 | 20 | 5 | 20 | 50 | 100 | 200 | — | — |
|  | Stearic acid *2 | 2 | 2 | 2 | 2 | 2 | 2 | 2 | 2 | 2 | 2 |
|  | Zinc flower *3 | 2 | 2 | 2 | 2 | 2 | 2 | 2 | 2 | 2 | 2 |
|  | Vulcanization accelerator A *4 | 0.4 | 0.4 | 0.4 | 0.4 | 0.4 | 0.4 | 0.4 | 0.4 | 0.4 | 0.4 |
|  | Vulcanization accelerator B *5 | 0.3 | 0.3 | 0.3 | 0.3 | 0.3 | 0.3 | 0.3 | 0.3 | 0.3 | 0.3 |
|  | Vulcanization accelerator C *6 | 0.8 | 0.8 | 0.8 | 0.8 | 0.8 | 0.8 | 0.8 | 0.8 | 0.8 | 0.8 |
|  | Sulfur *7 | 1.3 | 1.3 | 1.3 | 1.3 | 1.3 | 1.3 | 1.3 | 1.3 | 1.3 | 1.3 |
| Evaluation | Air permeability (Index value) | 49 | 35 | 50 | 100 | 80 | 50 | 40 | 35 | 103 | 105 |

*1 Cloisite20A manufactured by Southern Clay Products: montmorillonite organized with dimethyl dihydrogenated tallow ammonium chloride (Dimethyl dihydrogenated tallow ammonium cation contained in the dimethyl dihydrogenated tallow ammonium chloride has a structure of Formula (4), where $R^7$ is a methyl group, $R^8$ is a methyl group, $R^9$ is an alkyl group having a carbon number of 14 to 18, and $R^{10}$ is an alkyl group having a carbon number of 14 to 18.)
*2 PALMAC 1600 manufactured by ACID CHEM
*3 205P manufactured by MID WEST ZINC CO.
*4 VULKACIT DM/MG manufactured by BAYER
*5 VULKACIT D/EGC manufactured by BAYER
*6 CURE-RITE BBTS manufactured by BAYER
*7 Powdered sulfur manufactured by TSURUMI CHEMICAL INDUSTRY CO., LTD.

The results shown in Table 1 clearly show that the rubber compositions of Examples 1 to 5 and 6 to 10 that contain the amine-modified butyl-based rubber and the layered compound all exhibit far lower air permeability, and therefore extremely superior gas-barrier properties, as compared with the rubber compositions of Comparative Examples 1 to 5 each containing the halogenated butyl-based rubber and the layered compound (the compounding amount of which corresponds to the compounding amount of layered compound A for Examples 1 to 5), the rubber composition of Comparative Example 6 that contains the amine-modified butyl-based rubber but does not contain the layered compound, and the rubber composition of Comparative Example 7 that contains neither the amine-modified butyl-based rubber nor the layered compound. The rubber composition of Example 6, produced by preparing a rubber master batch that contains the amine-modified butyl-based rubber and the layered compound, and then mixing the rubber master batch with the compounding agents, exhibits superior gas-barrier properties to the rubber composition of Example 1, which produced by mixing the amine-modified butyl-based rubber, the layered compound, and the compounding agents, which have not undergone any rubber master batch process. Similarly, the rubber composition of Example 7 exhibits superior gas-barrier properties to the rubber composition of Example 2, the rubber composition of Example 8 exhibits superior gas-barrier properties to the rubber composition of Example 3, the rubber composition of Example 9 exhibits superior gas-barrier properties to the rubber composition of Example 4, and the rubber composition of Example 10 exhibits superior gas-barrier properties to the rubber composition of Example 5.

The invention claimed is:

1. A rubber composition comprising a layered compound, and a modified butyl-based rubber having a functional group that interacts with the layered compound,
wherein the modified butyl-based rubber contains isobutylene units and p-methyl styrene units, and the modified butyl-based rubber has a structure in which at least one hydrogen atom in a methyl group at p-position in the p-methyl styrene units is substituted by a group containing a nitrogen-containing functional group, and
wherein the group containing the nitrogen-containing functional group is at least one selected from the group consisting of the groups represented by the following formula (1)

[Formula 1]

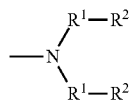

(1)

where each $R^1$ independently indicates an alkylene group having a carbon number of 1 to 8, and each $R^2$ independently indicates a nitrile group, or a substituted or unsubstituted amino group, the groups represented by the following formula (2)

[Formula 2]

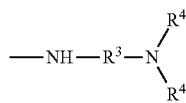

(2)

where $R^3$ indicates an alkylene group having a carbon number of 1 to 8, and each $R^4$ independently indicates a hydrogen atom or a protecting group, and
the groups represented by the following formula (3)
[Formula 3]

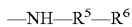

—NH—$R^5$—$R^6$ (3)

where $R^5$ indicates an alkylene group having a carbon number of 1 to 8, and $R^6$ indicates a hydrogen atom or a trialkoxysilyl group.

2. The rubber composition according to claim 1, wherein the interaction is hydrogen bonding.

3. The rubber composition according to claim 1, wherein the layered compound is at least one selected from the group consisting of kaolin mineral, serpentine, pyrophyllite-talc, mica, chlorite, smectite, and vermiculite.

4. The rubber composition according to claim 1, wherein the layered compound is at least one selected from the group consisting of montmorillonite, mica, vermiculite, beidellite, nontronite, saponite, hectorite, and stevensite.

5. The rubber composition according to claim 1, wherein the layered compound is mica and/or montmorillonite.

6. The rubber composition according to claim 1, wherein the layered compound is organized with an organizing agent.

7. The rubber composition according to claim 6, wherein the organizing agent contains at least one kind of onium cation selected from the group consisting of ammonium cation, phosphonium cation, oxonium cation, and sulfonium cation.

8. The rubber composition according to claim 6, wherein the organizing agent contains at least one of the quaternary ammonium cation having the structure represented by the following formula (4)

[Formula 4]

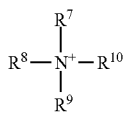

(4)

or the quaternary phosphonium cation having the structure represented by the following formula (5)

[Formula 5]

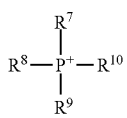

(5)

where $R^7$ to $R^{10}$ each independently represent an aryl group, an alkyl group having a carbon number of 1 to 30, a $(CH_2CH(CH_3)O)_nH$ group, or a $(CH_2CH_2O)_nH$ group, where n represents an integer of 1 to 50.

9. The rubber composition according to claim 1, wherein the rubber composition contains 1 to 200 parts by mass of the layered compound per 100 parts by mass of the modified butyl-based rubber.

10. The rubber composition according to claim 1, wherein $R^6$ in the formula (3) indicates a trialkoxysilyl group.

11. An inner liner material made of the rubber composition according to claim 1.

12. A pneumatic tire comprising an inner liner formed with the inner liner material according to claim 11.

* * * * *